United States Patent
Joshi

(10) Patent No.: US 7,215,966 B2
(45) Date of Patent: May 8, 2007

(54) SYSTEM AND METHOD FOR DETERMINING LOCATION OF A DEVICE IN A WIRELESS COMMUNICATION NETWORK

(75) Inventor: Avinash Joshi, Orlando, FL (US)

(73) Assignee: MeshNetworks, Inc., Maitland, FL (US)

( * ) Notice: Subject to any disclaimer, the term of this patent is extended or adjusted under 35 U.S.C. 154(b) by 297 days.

(21) Appl. No.: 10/863,871

(22) Filed: Jun. 7, 2004

(65) Prior Publication Data

US 2004/0259571 A1    Dec. 23, 2004

Related U.S. Application Data

(60) Provisional application No. 60/483,173, filed on Jun. 30, 2003, provisional application No. 60/475,882, filed on Jun. 5, 2003.

(51) Int. Cl.
*H04Q 7/20* (2006.01)

(52) U.S. Cl. .............. 455/456.1; 455/456.2; 455/452.1; 455/435.1; 455/436; 455/408; 455/450; 370/471; 370/218; 709/239; 709/242

(58) Field of Classification Search ............ 455/456.1, 455/456.2, 456.5, 452.1, 435.1, 436, 408, 455/450; 370/352, 466, 218; 709/239, 242
See application file for complete search history.

(56) References Cited

U.S. PATENT DOCUMENTS

| | | | |
|---|---|---|---|
| 4,466,060 A * | 8/1984 | Riddle ................ | 709/242 |
| 4,617,656 A | 10/1986 | Kobayashi et al. | |
| 4,736,371 A | 4/1988 | Tejima et al. | |
| 4,742,357 A | 5/1988 | Rackley | |
| 4,747,130 A | 5/1988 | Ho | |
| 4,910,521 A | 3/1990 | Mellon | |
| 5,034,961 A | 7/1991 | Adams | |
| 5,068,916 A | 11/1991 | Harrison et al. | |
| 5,231,634 A | 7/1993 | Giles et al. | |
| 5,233,604 A | 8/1993 | Ahmadi et al. | |
| 5,241,542 A | 8/1993 | Natarajan et al. | |
| 5,317,566 A | 5/1994 | Joshi | |

(Continued)

FOREIGN PATENT DOCUMENTS

CA    2132180    3/1996

(Continued)

OTHER PUBLICATIONS

Wong, et al., "Soft Handoffs in CDMA Mobile Systems," Dec. 1997, IEEE Personal Communications.

(Continued)

*Primary Examiner*—Joseph Feild
*Assistant Examiner*—Pierre-Louis Desir
(74) *Attorney, Agent, or Firm*—Randi L. Karpinia; Joseph J. Buczynski

(57) ABSTRACT

A system and method for message exchanges in a wireless communication network which minimize network overhead and offers fast determination of Coordinates of a device. A system and method controls a node to exchange small, structured messages with one or more reference nodes requesting the Coordinates of the reference node, which are then used in a periodic evaluation of time of flight messages from that reference node for determination of Coordinates of the node.

27 Claims, 3 Drawing Sheets

U.S. PATENT DOCUMENTS

| | | | |
|---|---|---|---|
| 5,392,450 A | 2/1995 | Nossen | |
| 5,412,654 A | 5/1995 | Perkins | |
| 5,424,747 A | 6/1995 | Chazelas | |
| 5,502,722 A | 3/1996 | Fulghum | |
| 5,517,491 A | 5/1996 | Nanni et al. | |
| 5,555,425 A | 9/1996 | Zeller et al. | |
| 5,555,540 A | 9/1996 | Radke | |
| 5,572,528 A | 11/1996 | Shuen | |
| 5,615,212 A | 3/1997 | Ruszczyk et al. | |
| 5,618,045 A | 4/1997 | Kagan et al. | |
| 5,621,732 A | 4/1997 | Osawa | |
| 5,623,495 A | 4/1997 | Eng et al. | |
| 5,627,976 A | 5/1997 | McFarland et al. | |
| 5,631,897 A | 5/1997 | Pacheco et al. | |
| 5,644,576 A | 7/1997 | Bauchot et al. | |
| 5,652,751 A | 7/1997 | Sharony | |
| 5,680,392 A | 10/1997 | Semaan | |
| 5,684,794 A | 11/1997 | Lopez et al. | |
| 5,687,194 A | 11/1997 | Paneth et al. | |
| 5,696,903 A | 12/1997 | Mahany | |
| 5,701,294 A | 12/1997 | Ward et al. | |
| 5,706,428 A | 1/1998 | Boer et al. | |
| 5,717,689 A | 2/1998 | Ayanoglu | |
| 5,745,483 A | 4/1998 | Nakagawa et al. | |
| 5,774,876 A | 6/1998 | Wooley et al. | |
| 5,781,540 A | 7/1998 | Malcolm et al. | |
| 5,787,080 A | 7/1998 | Hulyalkar et al. | |
| 5,794,154 A | 8/1998 | Bar-On et al. | |
| 5,796,732 A | 8/1998 | Mazzola et al. | |
| 5,796,741 A | 8/1998 | Saito et al. | |
| 5,805,593 A | 9/1998 | Busche | |
| 5,805,842 A | 9/1998 | Nagaraj et al. | |
| 5,805,977 A | 9/1998 | Hill et al. | |
| 5,809,518 A | 9/1998 | Lee | |
| 5,822,309 A | 10/1998 | Ayanoglu et al. | |
| 5,844,905 A | 12/1998 | McKay et al. | |
| 5,845,097 A | 12/1998 | Kang et al. | |
| 5,857,084 A | 1/1999 | Klein | |
| 5,870,350 A | 2/1999 | Bertin et al. | |
| 5,877,724 A | 3/1999 | Davis | |
| 5,881,095 A | 3/1999 | Cadd | |
| 5,881,372 A | 3/1999 | Kruys | |
| 5,886,992 A | 3/1999 | Raatikainen et al. | |
| 5,896,561 A | 4/1999 | Schrader et al. | |
| 5,903,559 A | 5/1999 | Acharya et al. | |
| 5,909,651 A | 6/1999 | Chander et al. | |
| 5,936,953 A | 8/1999 | Simmons | |
| 5,943,322 A | 8/1999 | Mayer et al. | |
| 5,987,011 A | 11/1999 | Toh | |
| 5,987,033 A | 11/1999 | Boer et al. | |
| 5,991,279 A | 11/1999 | Haugli et al. | |
| 6,028,853 A | 2/2000 | Haartsen | |
| 6,029,217 A | 2/2000 | Arimilli et al. | |
| 6,034,542 A | 3/2000 | Ridgeway | |
| 6,044,062 A | 3/2000 | Brownrigg et al. | |
| 6,047,330 A | 4/2000 | Stracke, Jr. | |
| 6,052,594 A | 4/2000 | Chuang et al. | |
| 6,052,752 A | 4/2000 | Kwon | |
| 6,064,626 A | 5/2000 | Stevens | |
| 6,067,291 A | 5/2000 | Kamerman et al. | |
| 6,067,297 A | 5/2000 | Beach | |
| 6,078,566 A | 6/2000 | Kikinis | |
| 6,104,712 A | 8/2000 | Robert et al. | |
| 6,108,738 A | 8/2000 | Chambers et al. | |
| 6,115,580 A | 9/2000 | Chuprun et al. | |
| 6,122,690 A | 9/2000 | Nannetti et al. | |
| 6,130,881 A | 10/2000 | Stiller et al. | |
| 6,132,306 A | 10/2000 | Trompower | |
| 6,147,975 A | 11/2000 | Bowman-Amuah | |
| 6,163,699 A | 12/2000 | Naor et al. | |
| 6,178,337 B1 | 1/2001 | Spartz et al. | |
| 6,192,053 B1 | 2/2001 | Angelico et al. | |
| 6,192,230 B1 | 2/2001 | Van Bokhorst et al. | |
| 6,208,870 B1 | 3/2001 | Lorello et al. | |
| 6,222,463 B1 | 4/2001 | Rai | |
| 6,222,504 B1 | 4/2001 | Oby | |
| 6,223,240 B1 | 4/2001 | Odenwald et al. | |
| 6,240,294 B1 | 5/2001 | Hamilton et al. | |
| 6,246,875 B1 | 6/2001 | Seaholtz et al. | |
| 6,249,516 B1 | 6/2001 | Brownrigg et al. | |
| 6,275,707 B1 | 8/2001 | Reed et al. | |
| 6,285,892 B1 | 9/2001 | Hulyalkar | |
| 6,304,556 B1 | 10/2001 | Haas | |
| 6,327,300 B1 | 12/2001 | Souissi et al. | |
| 6,349,091 B1 | 2/2002 | Li | |
| 6,349,210 B1 | 2/2002 | Li | |
| 6,359,872 B1 | 3/2002 | Mahany et al. | |
| 6,366,568 B1 | 4/2002 | Bolgiano et al. | |
| 6,405,049 B2 | 6/2002 | Herrod et al. | |
| 6,735,444 B2 | 5/2004 | Wingren | |
| 2002/0012320 A1* | 1/2002 | Ogier et al. | 370/252 |
| 2003/0232598 A1 | 12/2003 | Ajadeff et al. | |
| 2004/0033795 A1 | 2/2004 | Walsh et al. | |
| 2004/0102196 A1 | 5/2004 | Weckstrom et al. | |
| 2004/0203820 A1* | 10/2004 | Billhartz | 455/452.1 |
| 2004/0259571 A1* | 12/2004 | Joshi | 455/456.1 |

FOREIGN PATENT DOCUMENTS

| | | |
|---|---|---|
| EP | 0513841 A2 | 11/1992 |
| EP | 0627827 A2 | 12/1994 |
| EP | 0924890 A2 | 6/1999 |
| FR | 2683326 | 7/1993 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

Wong et al., "A Pattern Recognition System for Handoff Algorithms," Jul. 2000, IEEE Journal on Selected Areas in Communications, vol. 18, No. 7.

Andras G. Valko, "Cellular IP: A New Approach to Internet Host Mobility," Jan. 1999, ACM Computer Communication Review.

Richard North, Dale Bryan and Dennis Baker, "Wireless Networked Radios: Comparison of Military, Commercial and R&D Protocols," Feb. 28-Mar. 3, 1999, 2nd Annual UCSD Conference on Wireless Communications, San Diego, CA.

Benjamin B. Peterson, Chris Kmiecik, Richard Hartnett, Patrick M. Thompson, Jose Mendoza and Hung Nguyen, "Spread Spectrum Indoor Geolocation," Aug. 1998, Navigation: Journal of the Institute of Navigation, vol. 45, No. 2, Summer 1998.

Josh Broch, David A. Maltz, David B. Johnson, Yih-Chun Hu and Jorjeta Jetcheva, "A Performance Comparison of Multi-Hop Wireless Ad Hoc Network Routing Protocols," Oct. 25-30, 1998, Proceedings of the 4th Annual ACM/IEEE International Conference on Mobile Computing and Networking.

C. David Young, "USAP: A Unifying Dynamic Distributed Multichannel TDMA Slot Assignment Protocol".

Chip Elliott and Bob Heile, "Self-Organizing, Self-Healing Wireless Networks," 2000 IEEE.

J.J. Garcia-Luna-Aceves and Asimakis Tzamaloukas, "Reversing the Collision-Avoidance Handshake in Wireless Networks".

J.J. Garcia-Luna-Aceved and Marcelo Spohn, "Transmission-Efficient Routing in Wireless Networks Using Link-State Information".

J.J. Garcia-Luna-Aceves and Ewerton L. Madruga, "The Core-Assisted Mesh Protocol," Aug. 1999, IEEE Journal on Selected Areas in Communications, vol. 17, No. 8.

Ad Kamerman and Guido Aben, "Net Throughput with IEEE 802.11 Wireless LANs".

J.R. McChesney and R.J. Saulitis, "Optimization of an Adaptive Link Control Protocol for Multimedia Packet Radio Networks".

Ram Ramanathan and Regina Rosales-Hain, "Topology Control of Multihop Wireless Networks Using Transmit Power Adjustment".

Ram Ramanathan and Martha E. Steenstrup, "Hierarchically-Organized, Multihop Mobile Wireless Networks of Quality-of-Service Support".

Martha E. Steenstrup, "Dynamic Multipoint Virtual Circuits for Multimedia Traffic in Multihop Mobile Wireless Networks".

Zhenya Tang and J.J. Garcia-Luna-Aceves, "Collision-Avoidance Transmission Scheduling for Ad-Hoc Networks".

George Vardakas and Wendell Kishaba, "QoS Networking With Adaptive Link Control and Tactical Multi-Channel Software Radios".

\* cited by examiner

SYSTEM AND METHOD FOR DETERMINING LOCATION OF A DEVICE IN A WIRELESS COMMUNICATION NETWORK

This application claims benefit under 35 U.S.C. 119(e) from a U.S. Provisional Patent Application entitled "System and Method for Determining Location of a Device in a Wireless Communication Network", Ser. No. 60/483,173, filed on Jun. 30, 2003 and from a U.S. Patent Provisional Application entitled "System And Method To Maximize Channel Utilization In A Multi-Channel Wireless Communication Network", Ser. No. 60/475,882, filed on Jun. 5, 2003, the entire contents of each are incorporated herein by reference.

BACKGROUND OF THE INVENTION

1. Field of the Invention

The present invention relates to a system and method for message exchanges which minimize network overhead and offers fast determination of Coordinates of a node in a Wireless Communication Network. Specifically, the system and method controls a node to exchange small, structured messages with one or more reference nodes requesting the Coordinates of the reference node, which are then used in periodic evaluations of time of flight messages from that reference node for determination of Coordinates of the node.

2. Description of the Related Art

Wireless communication networks, such as mobile wireless telephone networks, have become increasingly prevalent over the past decade. These wireless communications networks are commonly referred to as "cellular networks", because the network infrastructure is arranged to divide the service area into a plurality of regions called "cells". A terrestrial cellular network includes a plurality of interconnected base stations, or base nodes, that are distributed geographically at designated locations throughout the service area. Each base node includes one or more transceivers that are capable of transmitting and receiving electromagnetic signals, such as radio frequency (RF) communications signals, to and from mobile user nodes, such as wireless telephones, located within the coverage area. The communications signals include, for example, voice data that has been modulated according to a desired modulation technique and transmitted as data packets. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format, which enables a single transceiver at a first node to communicate simultaneously with several other nodes in its coverage area.

In recent years, a type of mobile communications network known as an "ad-hoc" network has been developed. In this type of network, each mobile node is capable of operating as a base station or router for the other mobile nodes, thus eliminating the need for a fixed infrastructure of base stations. Details of an ad-hoc network are set forth in U.S. Pat. No. 5,943,322 to Mayor, the entire content of which is incorporated herein by reference.

More sophisticated ad-hoc networks are also being developed which, in addition to enabling mobile nodes to communicate with each other as in a conventional ad-hoc network, further enable the mobile nodes to access a fixed network and thus communicate with other mobile nodes, such as those on the public switched telephone network (PSTN), and on other networks such as the Internet. Details of these advanced types of ad-hoc networks are described in U.S. pat. No. 7,072,650 entitled "Ad Hoc Peer-to-Peer Mobile Radio Access System Interfaced to the PSTN and Cellular Networks", issued on Jul. 4, 2006, in U.S. pat. No. 6,807,165 "Time Division Protocol for an Ad-Hoc, Peer-to-Peer Radio Network Having Coordinating Channel Access to Shared Parallel Data Channels with Separate Reservation Channel", issued on Oct. 19, 2004, and in U.S. pat. No. 6,873,839 entitled "Prioritized-Routing for an Ad-Hoc, Peer-to-Peer, Mobile Radio Access System", issued on Mar. 29, 2005, the entire content of each being incorporated herein by reference.

In either conventional wireless communications networks, or in ad-hoc wireless communications networks, it may be necessary or desirable for a mobile node to be capable of knowing or determining a relative or absolute geographic location or position. As known to those skilled in the art, this can be achieved through the use of a number of technologies. These technologies can include cell identification, combined with Round Trip Time (RTT), Timing Advance (TA) and Measured Signal level (RX level), Time Difference of Arrival (TDOA) and Angle Of Arrival (AOA) techniques, the details of which can be appreciated by one skilled in the art. Another available technology can use cellular signal timing based methods for code division multiple access (CDMA) and wideband code division multiple access (WCDMA). Yet another technology can use Global Positioning System (GPS) techniques.

Despite the fact that the GPS technique has been in use for a considerable period of time and most of the world's navigation relies on this technique, the GPS technique is very susceptible to errors in measurement. Therefore, the GPS technique is capable of providing location determination results with very high accuracy only after performing a relatively large number of measurements to remove such errors. Other tests also demonstrate that the GPS technique is unsuitable for those terrestrial-based networks operating in locations where the number of simultaneous visible satellites is too small or not existent, like in underground tunnels, inside buildings, or in urban "canyons".

To overcome the above issues with determining location information, ad-hoc networks are being developed which do not require either the use of satellites or a centralized computing facility for determining location information. Further details of such ad-hoc networks are described in U.S. Pat. No. 6,728,545 entitled "A System and Method for Computing the Location of a Mobile Terminal in a Wireless Communications Network", filed on Nov. 16, 2001, the entire content of which is being incorporated herein by reference. Additionally, ad-hoc networks can be developed which utilize non-fixed, or movable infrastructure components. Further details of networks using movable access points and repeaters for minimizing coverage and capacity constraints are described in U.S. patent Publication No. 20030091010A1 entitled "Movable Access Points and Repeaters for Minimizing Coverage and Capacity Constraints in a Wireless Communications Network and a Method for Using the Same", filed Aug. 15, 2001, the entire content of which is being incorporated herein by reference.

The publications discussed above generally relate to mobile networks that connect to a permanent fixed network. However, as can be appreciated from the information referenced above, wireless ad-hoc networks do not necessarily have the same requirements, and include numerous communication issues that must be addressed in position determination.

In a typical wireless communication network, positions or Coordinates are typically found in the following manner. Reference nodes periodically transmit packets containing their Coordinates, the size of the packet can vary depending upon the accuracy desired. The Subscriber Devices receive and note the location of the reference nodes. Subscriber Devices then do specific time of flight measurements on these reference nodes at a regular interval, depending upon the accuracy desired. Coordinates of the Subscriber Devices are then determined by using the distance from various reference nodes thorough time of flight measurements, and the Coordinates of the reference nodes.

In such systems and methods, Coordinates of the reference nodes must be transmitted at a periodic rate. These are typically sent along with some periodic message like Hello Message or Neighbor Advertisement. If no such message is available, a special message needs to be sent at some periodic interval. However, periodic broadcast messages are expensive in a wireless ad-hoc network, especially where multi-channel MAC protocols are used, as it prevents other unicast messages from occurring during that period and hence, affects the number of devices present in an area (i.e. scalability). This information is particularly wasteful if few Subscriber Devices are using "Location Service". Not all subscribers want or pay for, such location services.

Additionally, the information about the location of fixed nodes does not typically change with time, that is fixed nodes will keep on transmitting the same coordinates all the time, simply consuming bandwidth and adding overhead. Therefore, the overhead can be reduced by increasing the interval between consecutive broadcast messages. However this increases the time intervals between which the Subscriber Device can determine its Coordinates. This is highly undesirable in a mobile ad-hoc network where nodes move at a fast speed.

Accordingly, a need exists for a system and method of location determination which reduces the required overhead on the network, while also improving the speed at which the Coordinates are determined.

SUMMARY OF THE INVENTION

An object of the present invention is to provide a system and method for message exchanges which minimize overhead and offers fast determination of Coordinates.

Another object of the present invention is to provide a system and method for receiving device type and other relevant information about the references in common message exchanges, such as Hello Messages and routing messages and maintain data in a neighbor table.

Another object of the present invention is to provide a system and method for a Location Service Mode, in which a node can issue a special message requesting Coordinates of references be sent.

Another object of the present invention is to provide a system and method for a Location Service Mode, in which a node can request and receive Coordinates of references using exchanges of very small messages.

Another object of the present invention is to provide a system and method for a Location Service Mode, in which a node can perform time of flight evaluations with references having known Coordinates at a selectable rate.

Another object of the present invention is to provide a system and method for a Location Service Mode, in which a node can use "location sequence number" to determine the rate of periodic updates of coordinates.

These and other objects are substantially achieved by providing a system and method for controlling a node within a wireless communication network in which the node can regularly probe a neighbor table for directing requests to reference nodes to send time of flight messages. Where initial data for a reference node is absent from the neighbor table, the system and method controls the node to issue a very small message to the reference node requesting the Coordinates of the reference node. This information can alternatively be included in routing messages. Once received, the time of flight messages from that reference node can be used to determine location. In doing so, the system and method has minimum overhead and offers fast determination of Coordinates.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

The embodiments of the present invention described below provide a system and method with which Coordinates of a subscriber device can be determined by minimum network overhead. Each embodiment relies on the fact that Coordinates of fixed nodes do not change with time (by definition) and hence can be found once by the subscriber nodes and used for a long time in place of being periodically transmitted by fixed nodes. Even if the node is not fixed, it does not need to send broadcast messages periodically as Coordinates can be obtained in a more efficient way from some other messages as described in greater detail below. Hence if the type of the node is known, major network overhead can be avoided.

Figure 1:
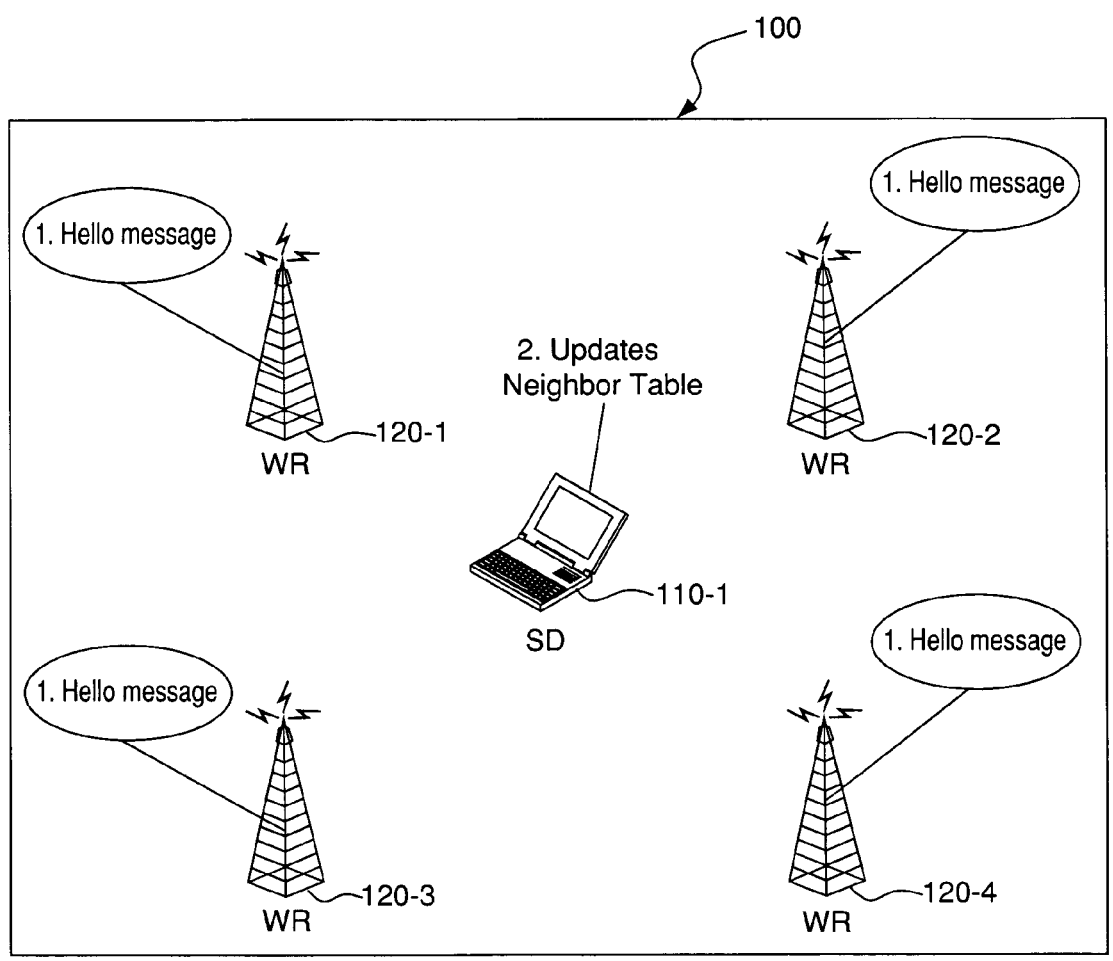
FIG. 1 is a block diagram of an example wireless communications network including a plurality of nodes processing Hello messages in accordance with an embodiment of the present invention.

FIG. 1 illustrates an example network 100, providing communications and location services. In the operation associated with the embodiment described below, several types of wireless devices are typically involved in the network 100, and exchange data for computing the location of each, while also supporting communications. These devices can include Subscriber Devices (SD) 110 and Wireless Routers (WR) 120 (i.e. fixed references) or Intelligent Access Point (IAP). In yet other embodiments of the present invention, any number of devices, such as enhanced Subscriber Devices, Intelligent Access Points, and so forth, can be used in cooperation with, or in place of the Wireless Routers 120.

Figure 2:
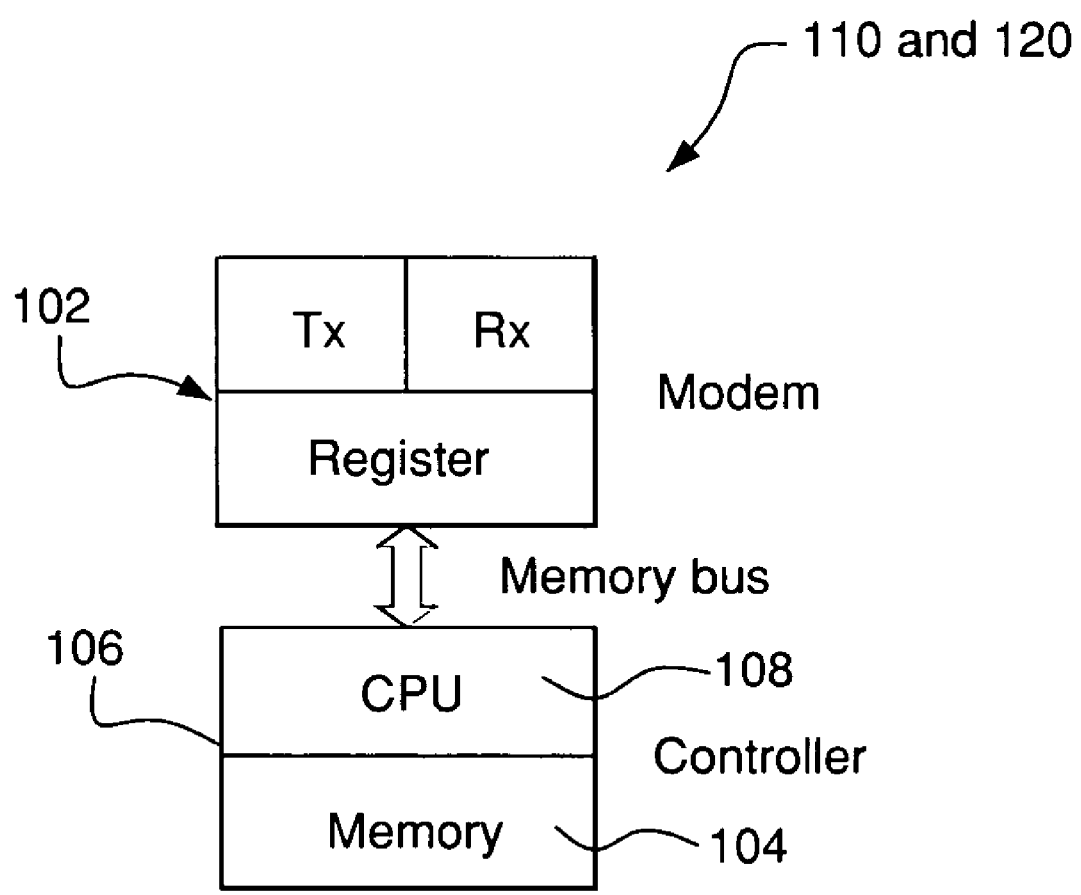
FIG. 2 is a block diagram illustrating an example of a device used in the network shown in FIG. 1.

FIG. 2 is a block diagram illustrating an example of a Subscriber Device 110 and Wireless Router 120 used in the network 100 of FIG. 1. The modem 102 assures radio communication with other components of the network using a transmitter (Tx) and a receiver (Rx). The operation of the transmitter and receiver is controlled by storing appropriate data in a memory 104 organized as a set of registers. The receiver and transmitter use the memory registers for providing feedback about the modem status and the result of executed functions.

The controller 106 of the Subscriber Device 110 and Wireless Router 120 in FIG. 2 also includes a CPU 108 and memory for storing data and the code of the program controlling the modem functions. It controls modem activity by writing data in modem registers via a memory bus, and reading Modem registers for finding the modem status. As shown in FIG. 2, the activity of all components of the Subscriber Device and Wireless Router are controlled by the software recorded in the controller memory 104 as program code and operating parameters. The Subscriber Devices 110 and Wireless Routers 120 can each receive messages from other Subscriber Devices, other Wireless Routers, or any number of other devices present in the network 100.

In a typical wireless communication network 100 as shown in FIG. 1, all devices such as the Wireless Routers and Subscriber Devices periodically transmit some kind of Hello Message or Neighbor Advertisement. These messages typically advertise their address (MAC or IP), the type of the node transmitting the message, and some other useful information about the transmitting node, and the contents of the packet can vary from one implementation to other.

If no such message is transmitted, a "Short Hello Message" can be used. As these messages are not rebroadcast (i.e. do not execute a communication "hop"), a node can receive this message only from its neighbor nodes and hence can use them to maintain its neighbor table. Additional details of "Short Hello Message" use is presented in U.S. Patent Application Publication No. 20040258040A1, entitled "System And Method To Maximize Channel Utilization In A Multi-Channel Wireless Communication Network", filed on Jun. 7, 2004, claiming priority from U.S. Patent Provisional Ser. No. 60/475,882 filed on Jun. 5, 2003, the entire content of which is being incorporated herein by reference.

Returning to FIG. 1, the devices of network 100 are shown processing Hello messages in accordance with an embodiment of the present invention. After receiving such messages, a Subscriber Device 110 knows about its neighboring nodes and also knows the device type of the neighbors, since they advertise their device type in the Hello Message, Neighbor Advertisement or "Short Hello Message". Additionally, in the neighbor table, the Subscriber Devices also have a field to place Coordinates of the neighboring nodes that may be received in association with these messages.

Figure 3:
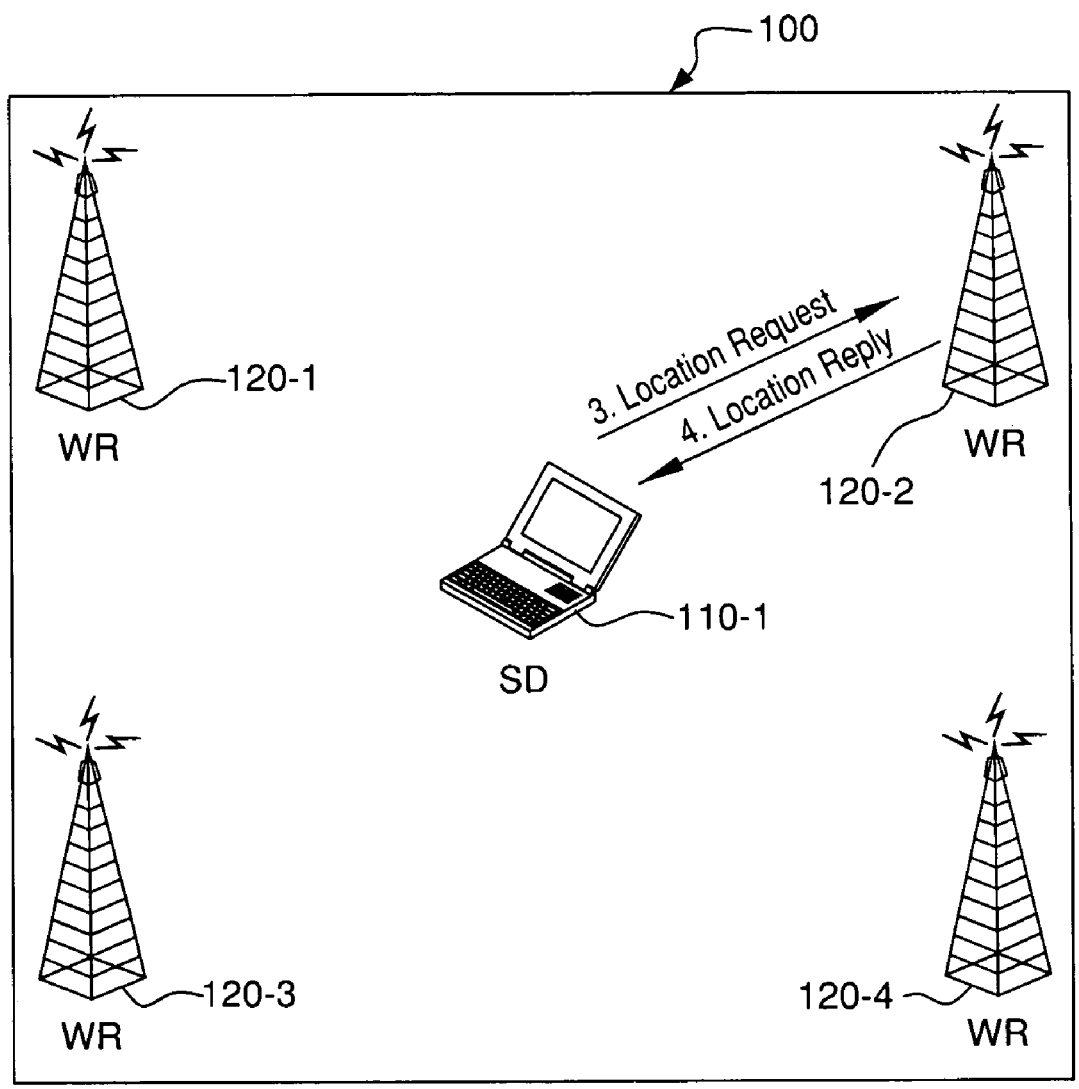
FIG. 3 is a block diagram of an example ad-hoc wireless communications network including a plurality of nodes processing an exchange of Location Request and Location Reply messages in accordance with an embodiment of the present invention.

If a Subscriber Device 110 is in "Location Service mode", it will regularly probe its neighbor table for the reference nodes to send time of flight messages. Initially there will be no information about the Coordinates of these reference nodes, and hence it will issue a special message called a Location Request to one or more of the reference nodes, which are typically fixed, as shown in FIG. 1. This packet can be a very small message having some bits to determine its type (e.g. Location Request), source, and destination addresses. Upon receiving such a Location Request packet, the fixed node sends back a Location Reply packet. The Location Reply packet can also be a very small message having some bits to determine its type ( e.g. Location Reply), source, and destination addresses, and its own Coordinates. An example of such an exchange of Location Request and Location Reply messages is shown in FIG. 3.

Once the Subscriber Device 110 receives this information, it stores it in appropriate fields in a neighbor table. This process can be repeated for every reference node, or Wireless Router 120, with unknown Coordinates in the neighbor table, or even fewer reference nodes depending upon the location algorithm used at the Subscriber Device. Once this information is stored, the Subscriber Device does not need to seek it again unless it enters a new neighborhood or network with new fixed neighbors.

The same method can be applied for reference nodes that are not always stationary. For example, FIG. 1 can include one or more enhanced Subscriber Devices in place of Wireless Routers that have been placed there just to provide location services, but are not typically fixed. In this case the Location Request and Location Reply can be sent at a periodic time, depending upon the type of the reference node. The period should depend upon the change detected in the coordinates of the reference nodes during successive Location Request/Location Reply messages. The periodic time can behave as a TCP window i.e. it can be increased if no change is detected for some time, and can be reduced again if a change is detected in the coordinates of the reference nodes.

There can be several variations to the protocol of the embodiments described above. In a first variation, a node can periodically check to find out if there are some reference nodes in its neighbor table without Coordinates and hence can issue Location Request messages to these reference nodes and store the Coordinates once it receives them in a Location Reply.

In a second variation, a node can also send a Location Request message to a reference node upon simply hearing its Hello Message, or any other message, for the first time.

In a third variation, sequence numbers can be used with the Location Request and Location Reply messages. To determine the location, nodes periodically do the time of flight measurements from the neighboring nodes, assuming that the last known Coordinates of the neighboring nodes are still valid. In these time of flight messages, which can just be a pair of modified RTS and CTS messages, "Location Sequence Numbers" can also be included.

To do this every node will maintain its own "Location Sequence Number". Every time it detects that there is a change in its own Coordinate, it will increase its own sequence number. This number is sent with all the reply messages sent for requested time of flight measurements. All the nodes requesting such time of flight measurements, and hence receiving the reply message, will store the current "Location Sequence Number" of the requested node. If in a subsequent time of flight reply, the sequence number has increased, the current node will know that the Coordinates of the requested node have changed and hence, a new Location Request should be sent. If a history of such changes in "Location Sequence Number" is maintained, the speed with which the reference node is moving can be determined, which can help to determine if it is "useful" as a location reference point or not.

This information can also be used to determine the periodic interval of sending Location Request messages. For example if the sequence number described above has not changed for a long time, then it can be safely said that the reference node is fixed, if at least for the time being, and hence need not be probed so frequently. On the other hand, if the "Location Sequence Number" is changing at a fast rate, it can be said that the reference node is mobile and hence should be probed more frequently to obtain the latest Coordinates.

The system and method of the embodiments described above can be further optimized by using routing messages. For example, if the network 100 of FIG. 1 is using a distance vector routing protocol, it will typically rely on the reception of Routing Advertisement (RA) messages to find the routes. These Routing Advertisements are broadcast on regular periodic intervals. To expedite handoffs, a device can send a unicast Routing Advertisement to request a unicast Routing Advertisement back from the infrastructure nodes. Additional details of such expedited handoffs are presented in U.S. patent application Publication No. 20040143842A1, entitled "System and Method for Achieving Continuous Connectivity to an Access Point or Gateway in a Wireless Network Following an On-Demand Routing Protocol, and to Perform Smooth Handoff of Mobile Terminals Between Fixed Terminals in the Network", filed on Jan. 13, 2004, the entire content of which is being incorporated herein by reference.

When such a unicast Routing Advertisement is sent, a bit in the Advertisement message can be set which indicates a request for the Coordinates of the receiving node. The infrastructure node can then piggyback its Coordinates in the Routing Advertisement. Thus the Subscriber Device can determine the route, as well as Coordinates, from a single message.

Similarly if an On-Demand Routing Protocol is used, a bit can be set in the Route Request packet to indicate a request for the Coordinates of the receiving node in the Route Reply. The infrastructure node can then piggyback its Coordinates in the Route Reply. Additional details of On-Demand Routing Protocols are presented in U.S. patent application Publication No. 20040143842A1 referenced above.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A method for enabling a node in a wireless communication network to determine its location coordinates, based on the location coordinates of at least one other node, the method comprising:
   controlling the node to request at least one other node to provide location coordinates either periodically or upon the node receiving at least one of a hello message, routing message, neighbor advertisement and short hello message from the said at least one other node and, in reply, controlling said at least one other node to provide the location coordinates;
   controlling the node to periodically evaluate time of flight messages received at the node from the at least one other node;
   controlling the node to estimate its own location coordinates based on the information pertaining to the location coordinates of the said at least one other node and the evaluation of the time of flight messages;
   assigning a respective sequence number to each respective other node;
   changing the sequence number of an other node when the location coordinates of that other node change; and
   controlling the node to check the sequence number of the other node when the node receives a time of flight message from that other node, and controlling the node to send a request to that other node to provide updated location coordinates if the sequence number is different from a sequence number for that other node that was previously received by the node.

2. A method as claimed in claim 1, wherein:
the request is at least one of a location request message, routing message and MAC message; and
the reply is at least one of a location reply message, routing message and MAC message.

3. A method as claimed in claim 1, wherein:
the node is a mobile node.

4. A method as claimed in claim 1, wherein:
the node stores the respective location coordinates of an other node at a location in a neighbor table corresponding to that other node.

5. A method as claimed in claim 1, wherein:
the three controlling steps are performed for each of a plurality of other nodes.

6. A method as claimed in claim 5, wherein:
at least one of the other nodes is mobile.

7. A method as claimed in claim 1, wherein:
the rate of periodicity depends on the rate of change of the coordinates of the at least one other node.

8. A method as claimed in claim 1, wherein:
the hello message, routing message, neighbor advertisement and short hello message each include information identifying a characteristic of the other node from which the message was sent.

9. A method as claimed in claim 1, wherein:
the wireless network includes an ad-hoc multi-hopping peer-to-peer wireless network.

10. A node in a wireless communication network that is adapted to determine its location coordinates, based on the location coordinates of at least one other node, the node comprising:
   a controller, adapted to control the node to request at least one other node to provide location coordinates either periodically or upon the node receiving at least one of a hello message, routing message, neighbor advertisement and short hello message from the said at least one other node and, in reply, controlling said at least one other node to provide the location coordinates; and
   the controller is further adapted to control the node to periodically evaluate time of flight messages received at the node from the at least one other node, and to control the node to estimate its own location coordinates based on the information pertaining to the location coordinates of the said at least one other node and the evaluation of the time of flight messages,
   a respective sequence number to each respective other node, and the sequence number of an other node change when the location coordinates of that other node change; and
   the controller of the node is further adapted to control the node to check the sequence number of the other node when the node receives a time of flight message from that other node, and to control the node to send a request to that other node to provide updated location coordinates if the sequence number is different from a sequence number for that other node that was previously received by the node.

11. A node as claimed in claim 10, wherein:
the request is at least one of a location request message, routing message and MAC message; and
the reply is at least one of a location reply message, routing message and MAC message.

12. A node as claimed in claim 10, wherein:
the node is a mobile node.

13. A node as claimed in claim 10, wherein:
the controller is further adapted to control the node to store the respective location coordinates of an other node at a location in a neighbor table corresponding to that other node.

14. A node as claimed in claim 10, wherein:
the controller is further adapted to perform the controlling operations for each of a plurality of other nodes.

15. A node as claimed in claim 14, wherein:
at least one of the other nodes is mobile.

16. A node as claimed in claim 10, wherein:
the rate of periodicity depends on the rate of change of the coordinates of the at least one other node.

17. A node as claimed in claim 10, wherein:
the hello message, routing message, neighbor advertisement and short hello message each include information identifying a characteristic of the other node from which the message was sent.

18. A node as claimed in claim 10, wherein:
the wireless network includes an ad-hoc multi-hopping peer-to-peer wireless network.

19. A method of operation of a communication device within a wireless communication network comprising:
transmitting a location request message to a reference node, wherein the location request message comprises a message type, a source address of the communication device, and a destination address of the reference node;
receiving a location reply message from the reference node, wherein the location reply message comprises a message type, the source address, the destination address, and a device coordinates of the at reference node;
storing the device coordinates associated with the reference node in a neighbor table;
repeating the transmitting, receiving, and storing steps for one or more other reference nodes; and
only repeating the transmitting, receiving, storing, and repeating steps when the communication device enters a new neighborhood with one or more new neighbor reference nodes,
wherein at least one of the reference nodes is a mobile reference node, the method further comprising:
storing a reference type associated with the mobile reference node in the neighbor table, wherein the reference type comprises a frequency of change of coordinates received from the mobile reference node; and
periodically repeating at a time period the transmitting, receiving, and storing steps for the mobile reference node, wherein the time period is associated with the reference type of the mobile reference node.

20. A method of operation of a communication device as claimed in claim 19 wherein the time period increases as the frequency of change of coordinates decreases; and further wherein the time period decreases as the frequency of change of coordinates increases.

21. A method of operation of a communication device as claimed in claim 19, further comprising prior to the repeating step:
periodically checking the neighbor tables to identify one or more reference nodes without stored coordinates, wherein the repeating step comprises repeating the transmitting, receiving, and storing steps for the one or more reference nodes without stored coordinates.

22. A method of operation of a communication device as claimed in claim 19, further comprising prior to the repeating step:
receiving a Hello Message from a new reference node, wherein the repeating step comprises repeating the transmitting, receiving, and storing steps for the new reference node.

23. A method of operation of a communication device as claimed in claim 19 further comprising:
determining a location of the communication device by using the stored coordinates to calculate a time of flight from each of the reference nodes.

24. A method of operation of a wireless communication network comprising a plurality of nodes comprising:
at each of the plurality of nodes;
maintaining a location sequence number;
detecting a change in location coordinates; and
increasing the location sequence number;
transmitting a time of flight message from a node to a neighbor node of the plurality of nodes;
communicating a time of flight reply from the neighbor node to the node, wherein the time of flight reply includes a current location sequence number for the neighbor node;
comparing by the node the current location sequence number with a stored location sequence number for the neighbor node;
transmitting a location request message from the node to the neighbor node when the current location sequence number is different from the stored location sequence number for the neighbor node, wherein the location request message comprises a message type, a source address of the node, and a destination address of the neighbor node;
receiving a location reply message by the node from the neighbor node, wherein the location reply message comprises a message type, the source address, the destination address, and a device coordinates of the neighbor node; and
storing the device coordinates associated with the neighbor node in a neighbor table of the node.

25. A method of operation of a wireless communication network as claimed in claim 24, the method further comprising:
storing a reference type associated with the neighbor node in the neighbor table; and
periodically repeating at a time period the transmitting, receiving, and storing steps for the mobile reference node, wherein the time period is associated with the reference type of the neighbor node.

26. A method of operation of a wireless communication network as claimed in claim 25, wherein the reference type comprises a frequency of change of the location sequence number of the neighbor node.

27. A method of operation of a communication device as claimed in claim 26 wherein the time period increases as the frequency of change of the location sequence number decreases; and further wherein the time period decreases as the frequency of change of the location sequence number increases.

* * * * *